(12) United States Patent
Konno

(10) Patent No.: US 8,201,084 B2
(45) Date of Patent: Jun. 12, 2012

(54) IMAGE PROCESSING APPARATUS AND COMPUTER READABLE MEDIUM

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 991 days.

(21) Appl. No.: 12/133,742

(22) Filed: Jun. 5, 2008

(65) Prior Publication Data
US 2009/0154811 A1 Jun. 18, 2009

(30) Foreign Application Priority Data
Dec. 18, 2007 (JP) .................. 2007-326267

(51) Int. Cl.
*G06F 17/21* (2006.01)

(52) U.S. Cl. ........ 715/243; 382/185; 382/187; 382/200; 382/181; 715/200; 715/252

(58) Field of Classification Search ....... 345/467–472.3; 715/200–277; 382/185, 321, 295–298, 305, 382/229, 176; 704/2–7
See application file for complete search history.

(56) References Cited

U.S. PATENT DOCUMENTS

| 6,012,073 | A * | 1/2000 | Arend et al. ................. 715/236 |
| 7,583,841 | B2 * | 9/2009 | Lin et al. ...................... 382/186 |

FOREIGN PATENT DOCUMENTS

| CN | 1838112 A | 9/2006 |
| JP | A-05-324720 | 12/1993 |
| JP | A-06-096288 | 4/1994 |
| JP | A-07-028829 | 1/1995 |
| JP | A-07-306951 | 11/1995 |
| JP | A-08-006948 | 1/1996 |
| JP | B2-3213197 | 10/2001 |
| JP | B2-3636490 | 4/2005 |
| JP | A-2005-196711 | 7/2005 |

OTHER PUBLICATIONS

Japanese Office Action issued in Japanese Patent Application No. 2007-326267 issued Jan. 26, 2010. (with translation).
Chinese Office Action issued in Chinese Patent Application No. 200810132389.X on Apr. 30, 2010 (with translation).
Dec. 27, 2011 Japanese Office Action issued in Japanese Patent Application No. 2010-141293 (with translation).
DTP Operation, "Ba in Basics," QuarkXPress' Tabular Composition Intensive Master, Professional DTP, Jul. 2003 Edition, Kogaku-Sha Co., Ltd., Jul. 1, 2003, First Version, pp. 91-100.

* cited by examiner

*Primary Examiner* — Jason M Repko
*Assistant Examiner* — David Perlman
(74) *Attorney, Agent, or Firm* — Oliff & Berridge, PLC

(57) ABSTRACT

An image processing apparatus includes: a region extracting unit extracts a character region on an image; a character recognizing unit that recognizes characters in the character region extracted by the region extracting unit; a translating unit that translates a recognition result obtained by the character recognizing unit; and a changing unit that changes a constitution of the image with respect to the character region extracted by the region extracting unit according to a direction of the characters in the character region extracted by the region extracting unit, and according to a direction of the characters of the language translated by the translating unit.

7 Claims, 8 Drawing Sheets

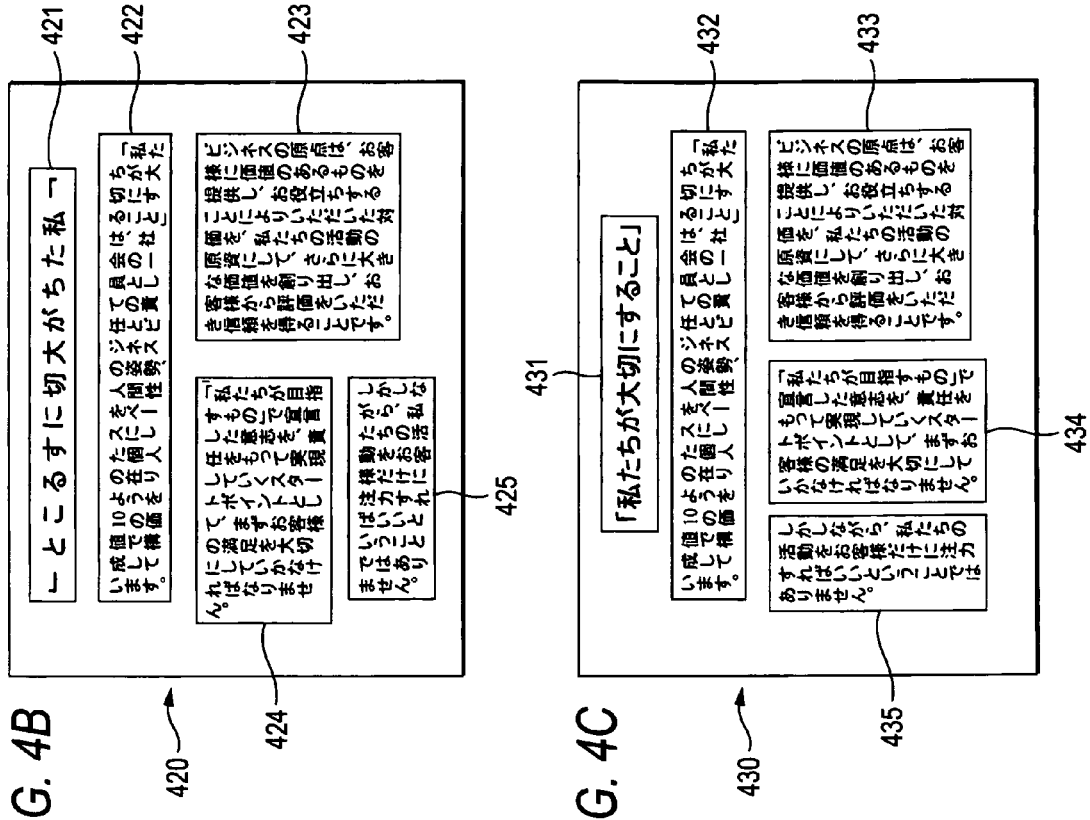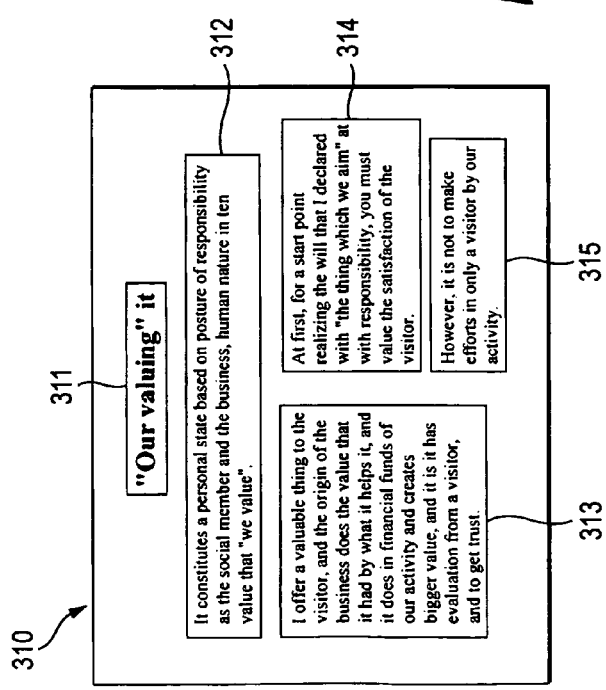

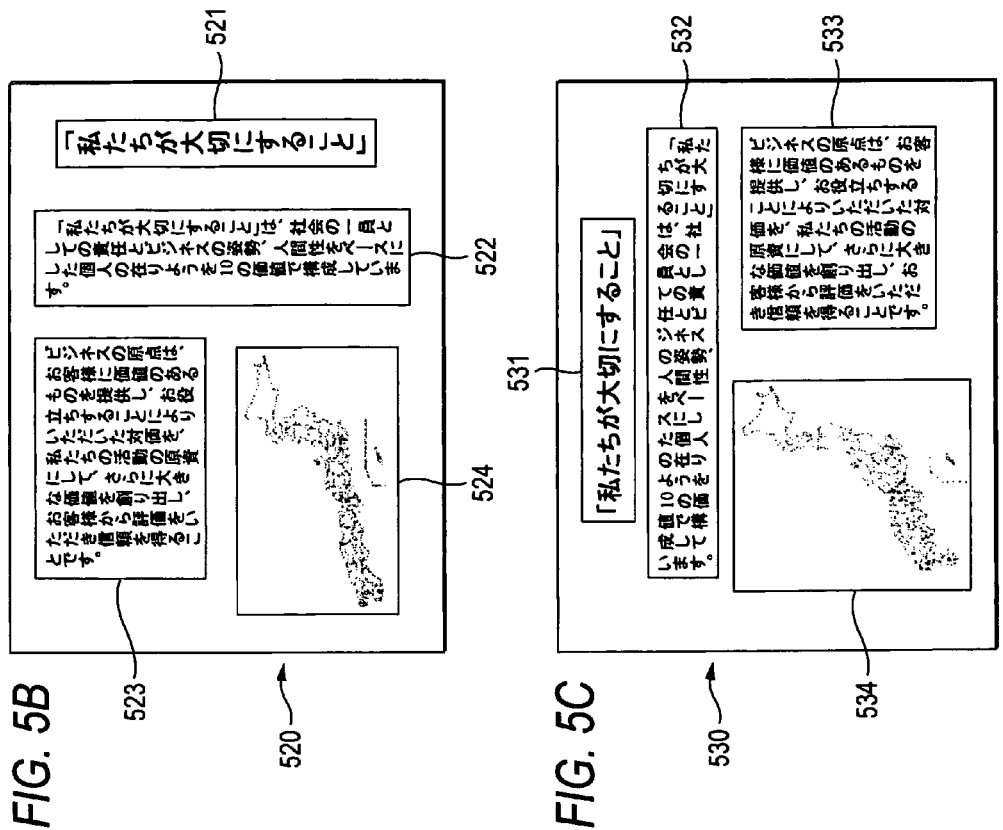

FIG. 6A
|   | A | B |
|---|---|---|
| あ |   |   |
| い |   |   |
| う |   |   |
FIG. 6B
|   | あ | い | う |
|---|---|---|---|
| A |   |   |   |
| B |   |   |   |
FIG. 7A
FIG. 7B
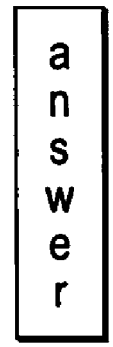

US 8,201,084 B2

IMAGE PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2007-326267 filed Dec. 18, 2007.

BACKGROUND

1. Technical Field

The present invention relates to an image processing apparatus and a computer readable medium.

2. Related Art

There is provided a system in which documents printed on sheets of paper are read in by a scanner and the thus read documents are translated by a computer and then outputted. An output, which is a result of the translation, is conventionally expressed by various methods. According to one of the methods, character rows, which have already been translated, are replaced or the translated sentences are added for each region in the original layout.

SUMMARY

According to a first aspect of the present invention, an image processing apparatus includes: a region extracting unit extracts a character region on an image; a character recognizing unit that recognizes characters in the character region extracted by the region extracting unit; a translating unit that translates a recognition result obtained by the character recognizing unit; and a changing unit that changes a constitution of the image with respect to the character region extracted by the region extracting unit according to a direction of the characters in the character region extracted by the region extracting unit, and according to a direction of the characters of the language translated by the translating unit.

BRIEF DESCRIPTION OF THE DRAWINGS

Exemplary embodiment of the present invention will be described in detail based on the following figures, wherein:

FIGS. 4A to 4C are schematic illustrations showing an example of the inversion processing made by the present embodiment;

FIGS. 5A to 5C are schematic illustrations showing an example of the processing of a region, in which an image region is included, made by the present embodiment;

FIGS. 6A and 6B are schematic illustrations showing an example of the processing in the case where a table region is made to be an object;

FIGS. 7A and 7B are schematic illustrations showing an example of the processing in the case where a character region of one line is made to be an object;

DETAILED DESCRIPTION

In the present embodiment, documents are received as images. (In this case, documents contain characters which are to be recognized and translated and figures and tables may be contained in the documents. Specific examples of the documents are: a business document, a sheet of newspaper and an advertisement.) Characters are recognized for the image and further translated. In this way, translated documents are generated by a layout of images similar to an original image. In order to prevent the occurrence of disturbance in a region in which sentences after making translations are existing, according to the directions of character rows before and after making translations, the layout is changed and the translated documents are outputted.

Figure 9B:
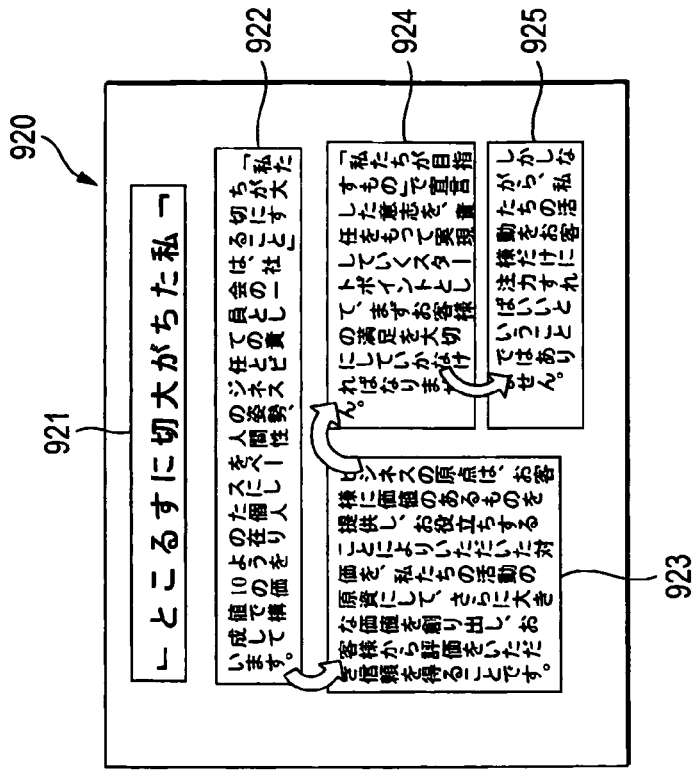
FIGS. 9A and 9B are schematic illustrations showing an example of an output in the case where the character realization and translation are made while the layout is being maintained.
Figure 9A:
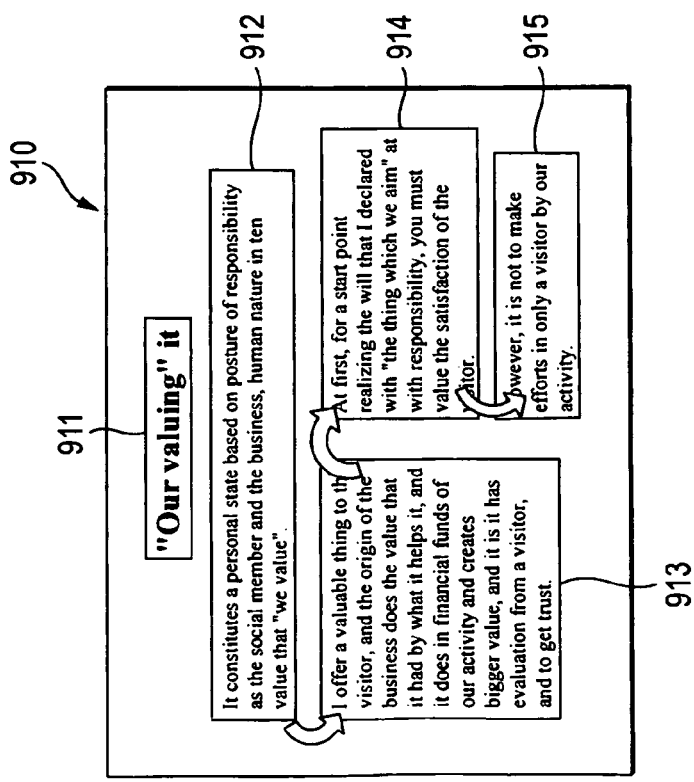

Referring to FIGS. 9A and 9B, specific explanations are made into a case in which a translated document is generated without changing an original image and a layout of the original image.

FIG. 9A is a view showing an original image 910. On the original image 910, the original character region 911, which is a title, exists and the original character region 912, which is a preamble, is composed by one stage. Below the original character region 912, paragraphs of the original character regions 913, 914, 915 are composed by two stages. In the case of English in which characters are written laterally, a direction of the character rows proceeds from the left to the right and a direction of the character lines proceeds from the top to the bottom. In this case, sentences are to be read in the order of the original character regions 912, 913, 914, 915.

FIG. 9 is a view showing an arrangement in which the original image 910 is subjected to the character recognition and translated and then the translated document is arranged according to the original layout. In the case where the translation is made from English to Japanese and the Japanese sentence is written vertically, a direction of the character row proceeds from the top to the bottom and a direction of the character line proceeds from the right to the left. In this case, it is not natural that reading is executed in the order of the conversion character regions 922, 923, 924, 925. Since the conversion character region 921, which is a title, is written vertically by one line, a direction of the character row proceeds from the right to the left.

Explanations will be made below into a preferred embodiment of the present invention, referring to the drawings.

Figure 1:
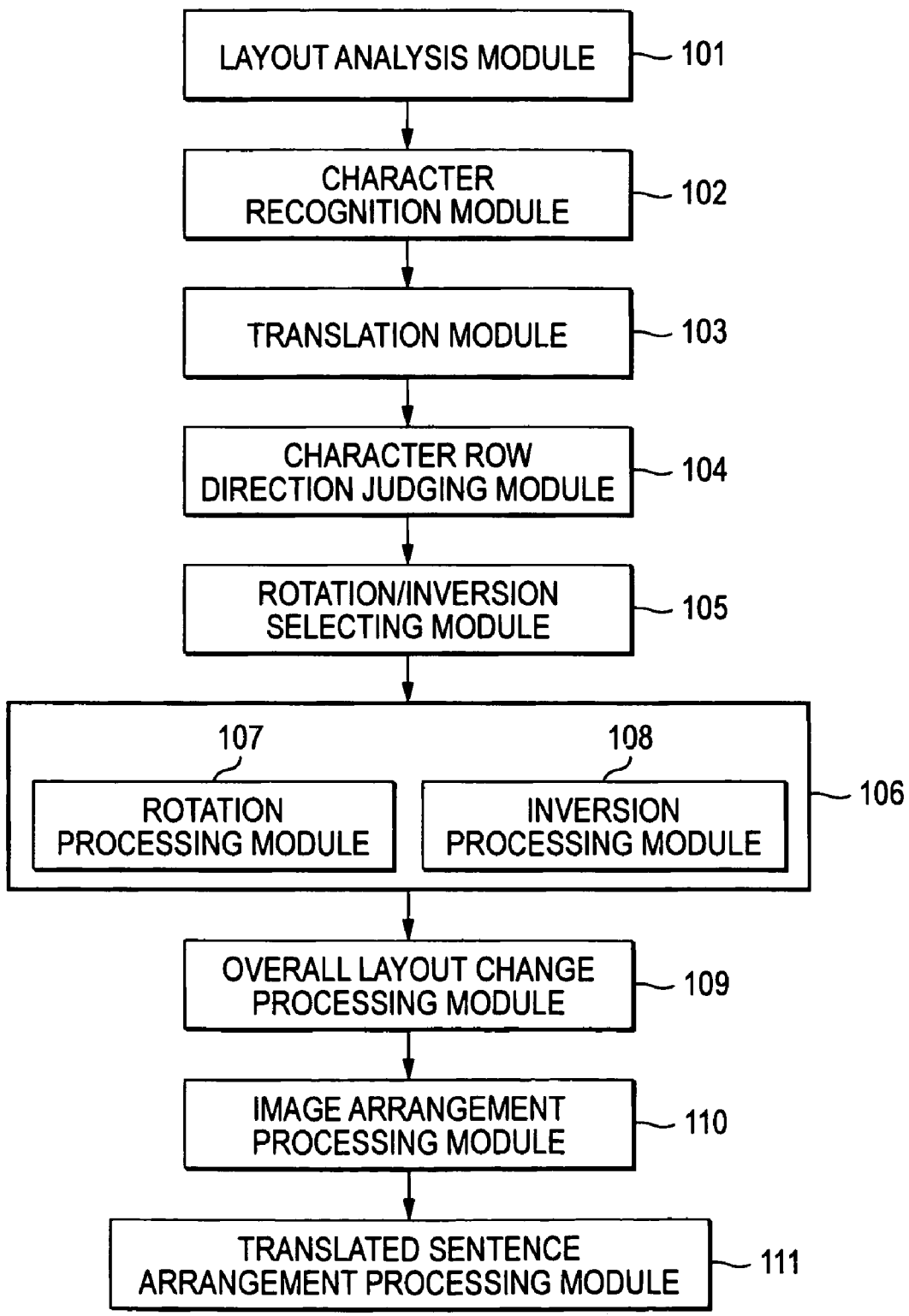
FIG. 1 is a conceptual constitution view showing an example of the constitution of the present embodiment.

FIG. 1 is a conceptual module arrangement view of an example of the arrangement of the present embodiment.

In this connection, the module indicates a part such as software (computer program), which can be generally, logically separated, or hardware. Accordingly, in the present embodiment, the module indicates not only a module in the computer program but also a module in hardware arrangement. Therefore, in the present embodiment, the computer program, the system and the method are explained. However, for the convenience of explanations, phrases of "to store", "to let store" and similar phrases are used. In the case where the embodiment is a computer program, these phrases mean that "to let store in a storage unit" or "to control so as to let store in a storage unit". The module substantially corresponds to a function one by one. However, in the actual mounting state, one module may be composed of one program. Alternatively, a plurality of modules may be composed of one program. On the contrary, one module may be composed of a plurality of programs. A plurality of modules may be carried out by one computer. By a computer arranged in a dispersion or parallel environment, one module may be carried out by a plurality of computers. In this connection, one module may include other modules. In the following descriptions, the terminology of "connection" includes not only a physical connection but also other logic connections such as a reception of data, a direction and a reference relation between data.

A system or a device includes an arrangement in which a plurality of computers, hardware or devices are connected to each other by a communication means such as a network including a communication connection connected one by one. Further, a system or a device includes a case in which the system or the device is realized by one computer, hardware or a device.

As shown in FIG. 1, the present embodiment includes: a layout analysis module 101; a character recognition module 102; a translation module 103; a character row direction judgment module 104; a rotation/inversion selection module 105; a rotation/inversion processing module 106; an entire layout change processing module 109; an image arrangement processing module 110; and a translated sentence arrangement processing module 111. The rotation/inversion processing module 106 includes: a rotation processing module 107; and an inversion processing module 108.

The layout analysis module 101 is connected to a character recognition module 102 and analyzes a layout of a received image. Then, the layout analysis module 101 delivers a result of the analysis to the character recognition module 102. In this case, "to receive an image" is "to receive an image inputted by a scanner", "to read out an image stored on a hard disk (a hard disk incorporated into a computer and a hard disk connected through a network)" or "to receive an image by means of facsimile". The image may be a binary image. Alternatively, the image may be a multi-value image. Alternatively, the image may be one sheet of image or a plurality of sheets of images. In this case, "to analyze an image" is "to extract a position for each region on the image (For example, in the case where the region is rectangular, the coordinates at the left upper position, the width and the length in the longitudinal direction are extracted.) and "to classify the region (For example, the region is classified into a character region, a figure region, a photographic image region and a table region.)". When the image is analyzed here, it is possible to use an existing technique such as a separation technique of separating a character and figure region. Further, concerning the extracted table region, a structure of the table may be analyzed, that is, the numbers of lines and rows on the table may be analyzed.

Further, a direction of the character row may be extracted by the layout analysis module 101. For example, a histogram of black pixels in the character region is made in the longitudinal or the lateral direction and the extraction may be made according to whether or not a shape of the histogram is peculiar to the vertical writing or the lateral writing. A direction of the character is delivered to the character row direction judgment module 104.

The character recognition module 102 is connected to a layout analysis module 101 and a translation module 103 and receives a result of analysis of the layout analysis module 101 and extracts a region which has been classified to be a character region. Then, the character recognition module 102 recognizes a character in the character region and delivers a result of the recognition to the translation module 103. For this character recognition, it is possible to use an existing technique. In this case, the character recognition module 102 may discriminates a language of the recognized characters. The character recognition module 102 may extract a direction of the character row in the same manner as that of the layout analysis module 101 described before. A direction of the characters is delivered to the character row direction judgment module 104.

The translation module 103 is connected to a character recognition module 102 and a character row direction judgment module 104 and receives a result of the character recognition made by the character recognition module 102 and translates the language to a predetermined language. Then, the translation module 103 delivers a result of the translation to the character row direction judgment module 104. In this case, the predetermined language is a language that has been previously determined or a language corresponding to the designating operation of an operator. It is possible to apply the existing technique to the translation.

The character row direction judgment module 104 is connected to a translation module 103 and a rotation/inversion selection module 105 and judges a direction of the characters in the character region extracted by the layout analysis module 101 or the character recognition module 102. In this connection, "a direction of the characters" may include a direction of the characters in one line and a direction of the other line. In this case, a direction of the characters in one line includes a distinction between the lateral writing and the vertical writing. Further, a direction of the characters in one line includes a distinction between "from the left to the right" and "from the right to the left" in the case of the lateral writing. A direction of the other line is a distinction between "from the right to the left" and "from the left to the right" in the case of vertical writing. In this case, one may be used or a plurality of them may be used being combined with each other.

The rotation/inversion selection module 105 is connected to the character row direction judgment module 104 and the rotation/inversion processing module 106 and receives a result of the judgment made by the character row direction judgment module 104 and selects a rotation processing module 107 or an inversion processing module 108 provided in the rotation/inversion processing module 106. According to the direction of the characters in the character region judged by the character row direction judgment module 104 and also according to the direction of the characters of the language translated by the translation module 103, it is selected whether or not the layout is subjected to the rotation processing or the inversion processing. A result of the selection is delivered to the rotation/inversion processing module 106. The phrase of "according to the direction of the characters" is more specifically explained as follows. In the case where a direction of the characters in the character region is different from a direction of the characters of the translated language, the rotation or the inversion processing may be selected which is conducted on the character region extracted by the layout analysis module 101. That is, in the case where a direction of the characters is different, the rotation processing may be selected.

In this case, the sentence that "A direction of the characters is different." is defined as follows. The lateral writing and the vertical writing may be simply different from each other. Not only the difference between the lateral writing and the vertical writing but also a direction of writing from the left to the right or from the right to the left may be an object of judgment in the case of the lateral writing. Further, a direction of the lines may be an object of judgment in the case of the vertical writing, that is, a direction from the right to the left or a direction from the left to the right may be an object of judgment in the case of the vertical writing.

In this connection, concerning the direction of the characters of the translated language, depending upon the language, two types of character directions are provided. For example, in the case of Japanese, in the case of the lateral writing from the left to the right, the line proceeds from the top to the bottom. In the case of the vertical writing from the top to the bottom, the line proceeds from the right to the left. In the case described above, the predetermined direction is selected. In this case, the predetermined direction is a direction previously determined, that is, a direction corresponding to the designated operation executed by an operator.

Further, the rotation/inversion selection module 105 may conduct the rotation processing or the inversion processing on the character region extracted by the layout analysis module 101 according to a relation between the proceeding direction of the character row and the line in the case where the proceeding direction of the character row and the line in the character region is subjected to the rotation processing or the inversion processing and the proceeding direction of the character row and the line of the language translated by the translation module 103. That is, processing may be selected so that the proceeding direction of the character row can agree with the proceeding direction of the line, which satisfies the phrase of "according to the direction of the characters". Further, processing may be selected so that the proceeding direction of the character row and the proceeding direction of the line are reversed and made to agree with each other.

The rotation/inversion selection module 105 may select the rotation processing or the inversion processing according to whether or not the image region has been extracted by the layout analysis module 101. In the case where the image region has been extracted, the inversion processing may be selected irrespective of the direction of the characters.

The rotation/inversion processing module 106 is connected to the rotation/inversion selection module 105 and the overall layout change processing module 109. The layout is changed when processing is conducted by the rotation processing module 107 or the inversion processing module 108, which is selected by the rotation/inversion selection module 105, on the character region extracted by the layout analysis module 101.

The rotation processing executed by the rotation processing module 107 is to rotate the image layout to the right or the left by 90°. A specific example will be described later referring to FIGS. 3A to 3C.

The inversion processing executed by the inversion processing module 108 is to conduct a mirror image inversion, in which an image is inverted in the lateral direction, on a layout of the image. A specific example will be described later referring to FIGS. 4A to 4C.

The overall layout change processing module 109 is connected to the rotation/inversion processing module 106 and the image arrangement processing module 110. The overall layout change processing module 109 changes the overall layout with respect to a result of the change made for the individual regions by the rotation/inversion processing module 106. The result is delivered to the image arrangement processing module 110. For example, a size of the sheet of paper may be enlarged or reduced and a document image, which is vertically placed, may be changed to a document which is laterally placed. Further, the layout may be changed according to the operation made by an operator.

The image arrangement processing module 110 is connected to the overall layout change processing module 109 and the translated sentence arrangement processing module 111. The image arrangement processing module 110 arranges an image, which has been extracted by the layout analysis module 101, in a layout changed by the overall layout change processing module 109 and then the image is delivered to the translated sentence arrangement processing module 111. In the case where a size of the image region is different from the size of the original image, the image region may be enlarged or reduced in accordance with the size. In this connection, in the case where no image region is extracted by the layout analysis module 101, the image arrangement processing module 110 executes no processing.

The translated sentence arrangement processing module 111 is connected to the image arrangement processing module 110. After an image has been arranged by the image arrangement processing module 110, a result of translation made by the translation module 103 is arranged in the changed character region, that is, a so-called pouring processing is executed. That is, the characters, which have been translated, are successively arranged in the objective regions according to the character row direction and the character size. The translated sentence arrangement processing module 111 may output a result of the translation in which the layout has been changed. In this case, the output includes to output an image of the result of translation from a printer, to store the image on a hard disk or others, to send a facsimile by a facsimile machine to another facsimile machine and to send an image to another device through a communication line.

Figure 2:
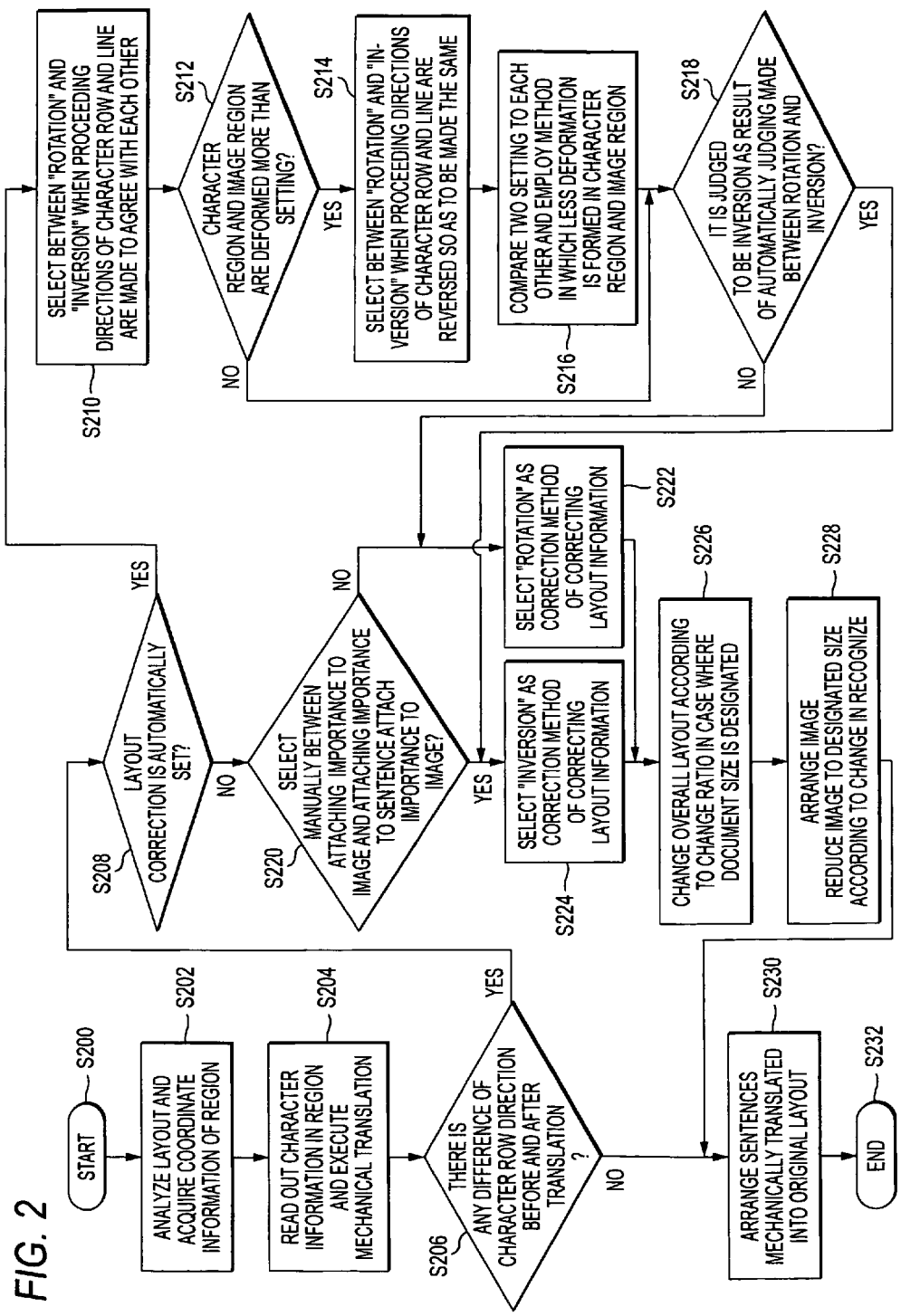
FIG. 2 is a flow chart showing an example of the processing made by the present embodiment.

FIG. 2 is a flow chart showing an example of processing executed by the present embodiment.

In step S202, the layout analysis module 101 analyzes a layout of the received image and acquires coordinate information of each region. In this case, the coordinate information is information by which a region on the image can be specified. Information about the region is also acquired.

In step S204, the character recognition module 102 recognizes characters on the image in the character region acquired by the character recognition module 102 in step S202 and the translation module 103 makes translations with respect to the result of character recognition.

In step S206, the character row direction judgment module 104 judges whether or not a direction of the character row before the translation is different from a direction of the character row after the translation. When a difference is found in this judgment (in the case of Y), the program proceeds to step S208. When no difference is found in this judgment (in the case of N), the program proceeds to step S230.

In step S208, the character row judgment module 104 judges whether or not a layout correction (change) is automatically set. In the case where the layout correction (change) is automatically set in the judgment (in the case of Y), the program proceeds to step S210. In the case except for that (in the case of N), the program proceeds to step S220. Whether or not the setting is automatically made, that is, whether or not the present embodiment decides a layout may be previously determined. Alternatively, whether or not the setting is automatically made may be judged according to the operation executed by an operator.

In step S210, the rotation/inversion selecting module 105 selects "a rotation" or "an inversion" when the proceeding directions of the character row and the line are made to agree with each other. That is, it is judged whether or not the proceeding direction of the character row after the completion of translation agrees with the proceeding direction of the line in the case where the proceeding direction of the character row before the start of translation and the proceeding direction of the line are rotated or inverted. Then, the processing, in which the proceeding direction of the character row after the completion of translation agrees with the proceeding direction of the line, is selected. For example, in the case where the character row before the start of translation is laterally written (The character row proceeds from the left to the right and the line proceeds from the top to the bottom.) and the character row after the completion of translation is vertically written (The character row proceeds from the top to the bottom and the line proceeds from the right to the left.), when the character row before the start of translation, which is laterally written, is rotated to the right by 90°, it coincides with the character row which is vertically written. That is, the proceeding direction of the character row is changed from "from the left to the right" to "from the top to the bottom" and the proceeding direction of the line is changed from "from the top to the bottom" to "from the right to the left". Therefore, the character row horizontally written agrees with the character row vertically written.

In this case, a selection may be made between the rotation and the inversion only by the direction of characters.

In step S212, in the case where the rotation/inversion selecting module 105 executes a selected processing in step S210, it is judged whether or not a deformation, which is higher than a predetermined deformation, is generated in the character region and the image region including the figure region. When it is judged that the deformation is generated (in the case of Y), the program proceeds to step S214. In the case except for that (in the case of N), the program proceeds to step S218. Whether or not the deformation is generated is judged by whether or not a ratio of the width to the height of the region is in a range of the setting value or whether or not the number of characters in one line is in a range of the setting value. In this case, weighing may be made according to the number of the regions or the area of each region. Concerning the conditions for judging whether or not the deformation exists, whether the respective conditions are valid or invalid may be set.

In step S214, the rotation/inversion selecting module 105 selects "a rotation" or "an inversion" when the proceeding directions of the character row and the line are made to agree with each other being reversed. That is, it is judged whether or not the proceeding direction of the character row after the completion of translation agrees with the proceeding direction of the line in the case where the proceeding direction of the character row before the start of translation and the proceeding direction of the line are rotated or inverted. Then, the processing, in which the proceeding direction of the character row after the completion of translation agrees with the proceeding direction of the line, is selected. For example, in the case where the character row before the start of translation is laterally written (The character row proceeds from the left to the right and the line proceeds from the top to the bottom.) and the character row after the completion of translation is vertically written (The character row proceeds from the top to the bottom and the line proceeds from the right to the left.), first, the proceeding direction of the character row before the start of translation and the proceeding direction of the line are reversed (changed over). That is, the proceeding direction of the character row proceeds from the top to the bottom and the proceeding direction of the line proceeds from the left to the right. When this is inverted (the right and left are inverted to each other.), the proceeding direction of the character row proceeds from the top to the bottom and the proceeding direction of the line proceeds from the right to the left. Therefore, the direction after the completion of translation agrees with the direction of the vertical writing.

In this case, the processing, which has not been selected in step S210, may be selected. That is, in the case where "rotation" is selected in step S210, "inversion" is selected.

In step S216, the rotation/inversion selecting module 105 measures a deformation generated in the case where the processing selected in step S210 is executed and also measures a deformation generated in the case where the processing selected in step S214 is executed. Then, the rotation/inversion selecting module 105 employs a processing in which the deformation is lower, that is, the rotation/inversion selecting module 105 employs the rotation processing or the inversion processing.

In step S218, the rotation/inversion module 105 judges whether or not a judgment of "inversion" has been made as a result of the processing selected in step S210 or the processing employed in step S216. In the case of the judgment of "inversion" (in the case of Y), the program proceeds to step S224. In the case except for that (in the case of N), the program proceeds to step S222.

In step S220, the rotation/inversion module 105 selects whether importance is attached to images or importance is attached to sentences according to the operation executed by an operator. In the case where importance is attached to images (in the case of Y), the program proceeds to S224. In the case except for that (in the case of N), the program proceeds to step S222.

In step S222, the rotation/inversion selecting module 105 selects "rotation" for the processing of changing the layout and the rotation processing module 107 executes the rotation processing.

In step S224, the rotation/inversion selecting module 105 selects "inversion" for the processing of changing the layout and the inversion processing module 108 executes the inversion processing.

In step S226, in the case where a size of the document to be outputted is designated, the overall layout changing processing module 109 changes the overall layout in accordance with a changing ratio.

In step S228, the image arrangement processing module 110 arranges an image. In this case, in accordance with the size of the region, a size of the image is reduced in a range of the designated reduction ratio. In this case, the designated reduction ratio shows a limit of the reduction ratio in the case of reducing the size. The designated reduction ratio may be previously decided. Depending upon an image, when a size of the image is reduced by a reduction ratio exceeding a predetermined value, it becomes ugly in some cases. Therefore, the limit of the reduction ratio is decided as described above.

In step S230, the translated sentence arrangement processing module 111 arranges the translated sentence in the original character region, wherein a size and position are different in some cases.

Figure 3C:
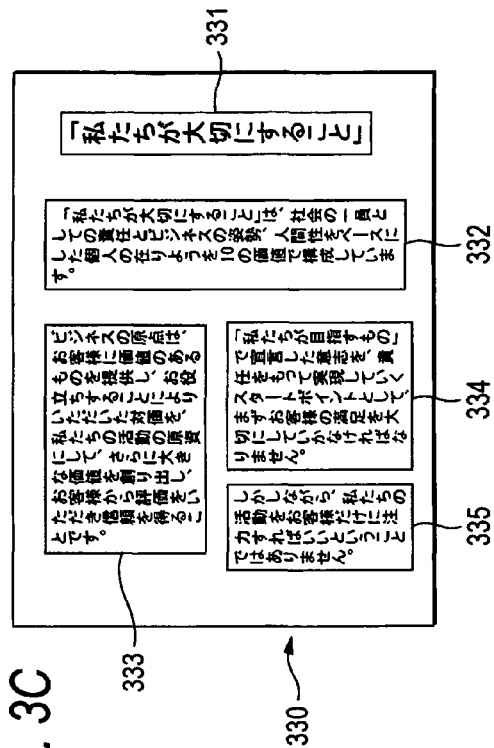
FIGS. 3A to 3C are schematic illustrations showing an example of the rotation processing made by the present embodiment.
Figure 3B:
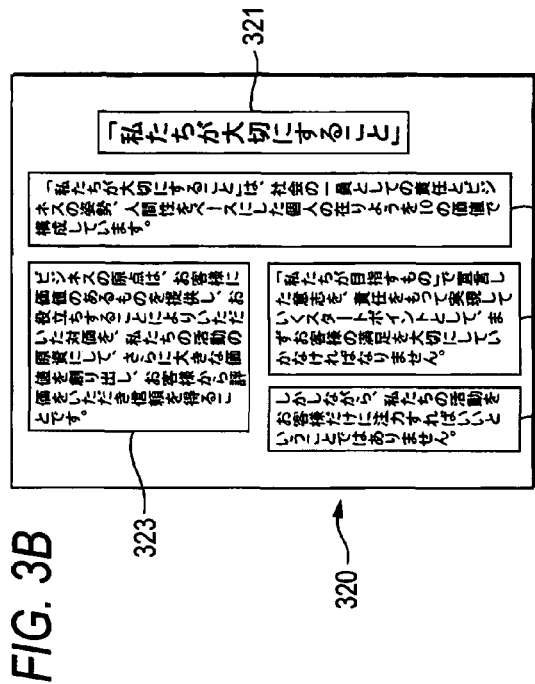
Figure 3A:
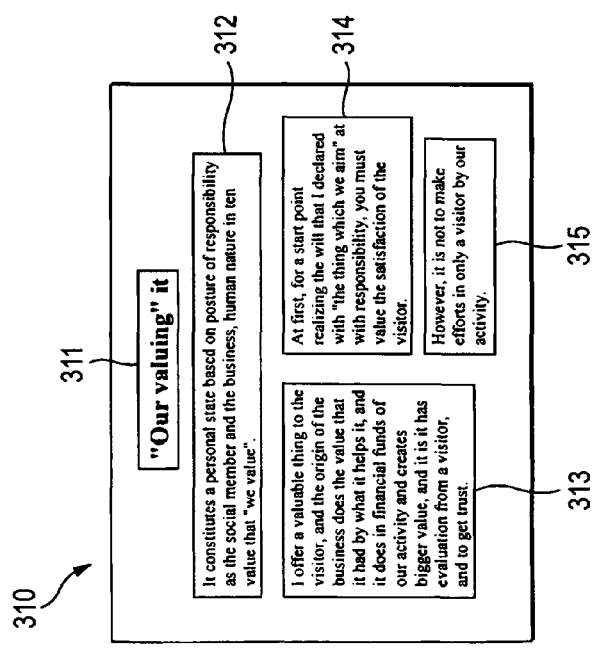

FIGS. 3A to 3C are schematic illustrations showing an example of the rotation processing executed in the present embodiment.

The original image 310 shown in FIG. 3A includes original character regions 311, 312, 313, 314 and 315. This constitution is the same as that shown in FIG. 9A.

The conversion image 320 shown in FIG. 3B is obtained when the original image 310 is subjected to the rotation processing. The converted character region 321 corresponds to the original character region 311. The converted character region 322 corresponds to the original character region 312. The converted character region 323 corresponds to the original character region 313. The converted character region 324 corresponds to the original character region 314. The converted character region 325 corresponds to the original character region 315. That is, the layout of the conversion image 320 is obtained when the layout of the original image 310 is rotated to the right by 90°. On the original image 310, the character rows are laterally arranged. On the conversion image 320, the character rows are vertically arranged. The order of reading of the character regions on the conversion image 320 is the conversion character region 322, 323, 324 and 325. Since these sentences are written by Japanese, this layout is more preferable than that shown in FIG. 9B.

The conversion image 330 shown in FIG. 3C is an example in which the conversion image 320 is further subjected to processing by the overall layout change processing module 109. That is, the conversion character region 331 corresponds to the original character region 311. The conversion character region 332 corresponds to the original character region 312. The conversion character region 333 corresponds to the original character region 313. The conversion character region 334 corresponds to the original character region 314. The conversion character region 335 corresponds to the original character region 315. In order to laterally arrange the overall layout of the conversion image 330, the aspect ratio of each character region is changed. For example, specifically, the conversion character region 322 includes three lines, however, the conversion character region 332 includes four lines.

FIGS. 4A to 4C are schematic illustrations showing an example of the inversion processing executed in the present embodiment.

The constitution of original image 310 shown in FIG. 4A is the same as that of the image shown in FIG. 3A.

The conversion character region 421 shown in FIG. 4B is obtained when the original image 310 is subjected to the inversion processing. That is, the conversion character region 421 corresponds to the original character region 311. The conversion character region 422 corresponds to the original character region 312. The conversion character region 423 corresponds to the original character region 313. The conversion character region 424 corresponds to the original character region 314. The conversion character region 425 corresponds to the original character region 315. That is, the layout of the conversion image 420 is obtained when the layout of the original image 310 is laterally inverted. On the original image 310, the original character region 313 is arranged on the left, however, on the conversion image 420, the conversion character region 423 corresponding to the original character region 313 is arranged on the right. On the original image 310, the original character regions 314, 315 are arranged on the right, however, the conversion character regions 424, 425 corresponding to the original character regions 314, 315 are arranged on the left. The order of reading of the character regions on the conversion image 420 is the conversion character regions 422, 423, 424 and 425. Since these sentences are written by Japanese, this layout is more preferable than that shown in FIG. 9B.

The conversion image 430 shown in FIG. 4C is an example obtained when the conversion image 420 is further subjected to processing by the overall layout change processing module 109. That is, in the conversion character region 421, the sentence is vertically written in such a manner that one character is arranged in one line. Therefore, this is changed to the lateral writing from the left to the right and the font used for the vertical writing is changed to the font used for the lateral writing. According to the operation executed by an operator, the conversion character regions 424, 425, which are vertically arranged on the conversion image 420, are laterally arranged like the conversion character regions 434, 435.

FIGS. 5A to 5C are schematic illustrations showing an example of the processing of the present embodiment executed in the case where an image region is contained.

The original image 510 shown in FIG. 5A includes the original character regions 511, 512, 513 and 514.

The conversion image 520 shown in FIG. 5B is obtained when the original image 510 is subjected to the rotation processing. The conversion character region 521 corresponds to the original character region 511. The conversion character region 522 corresponds to the original character region 512. The conversion character region 523 corresponds to the original character region 513. The conversion figure region 524 corresponds to the original figure region 514. However, since the conversion image 520 is laterally arranged, the aspect ratio of the conversion figure region 524 differs from that of the original figure region 514.

The conversion image 530 shown in FIG. 5C is obtained when the original image 510 is subjected to the inversion processing. The conversion character region 531 corresponds to the original character region 511. The conversion character region 532 corresponds to the original character region 512. The conversion character region 533 corresponds to the original character region 513. The conversion figure region 534 corresponds to the original figure region 514. The conversion image 530 is an image in which the original figure region 514 is maintained at the same ratio.

As shown in FIGS. 3, 4 and 5, the rotation processing and the inversion processing respectively have merits and demerits.

In the rotation processing, the reproducibility of the overall layout is high. In many cases, the rotation processing is executed in the case of replacing the vertical writing and the lateral writing with each other. In the rotation processing, since the proceeding direction of the character row and that of the line agree with each other, the reproducing performance is high.

However, the rotation processing has a demerit in which the aspect ratio of the entire layout is changed. The reason why the aspect ratio of the entire layout is changed is that the original aspect ratio can not be maintained in the rotation processing since the entire image is rotated. Therefore, the misalignment tends to occur on an image or in a table region. The image and the table region are not flexible as compared with the sentence region. Therefore, the image and the table region are affected by a change in the aspect ratio.

Next, in the inversion processing, the aspect ratio of the entire layout is not changed. That is, the region size is not changed. Therefore, no misalignment is not caused on the image and the table region.

However, the inversion processing has a demerit in which the reproducibility performance of the overall layout is inferior to that of the rotation processing. The reason is described as follows. In the case of replacing the vertical writing and the lateral writing with each other, the proceeding direction of the character row is replaced with the proceeding direction of the line and agree with each other.

Accordingly, in order to make a translated document of a stable layout, depending upon the use or the case, the rotation processing and the inversion processing may be changed over with each other. For example, in the case where a figure region exists on an original image, the rotation/inversion selection module 105 may select the inversion processing.

FIGS. 6A and 6B are schematic illustrations showing an example of processing which is conducted on a table region.

Concerning the table region, the layout analysis module 101 may analyze a constitution of the table region. The image arrangement processing module 110 may change the constitution of the table. For example, as shown in FIG. 6A, in the case where a layout is changed for the table of four lines and three rows, to be specific, in the case where an aspect ratio is changed, the aspect ratio is not simply changed by an enlargement and reduction but as shown in FIG. 6B, the lines and the rows are replaced with each other so as to be changed into the table of three lines and four rows.

FIGS. 7A and 7B are schematic illustrations showing an example of processing conducted on a character region of one line.

FIGS. 4A to 4C show a case in which one line is one character in the vertical writing. However, in the case where a language of the vertical writing is translated into a language of the lateral writing, it is possible that the character region is not made into a character region of the lateral writing but the character region is maintained in the vertical writing. For example, the character region of one line of "kaitou" shown in FIG. 7A may be made into the character region of "answer" of the vertical writing shown in FIG. 7B because this writing method is allowed, too.

Figure 8:
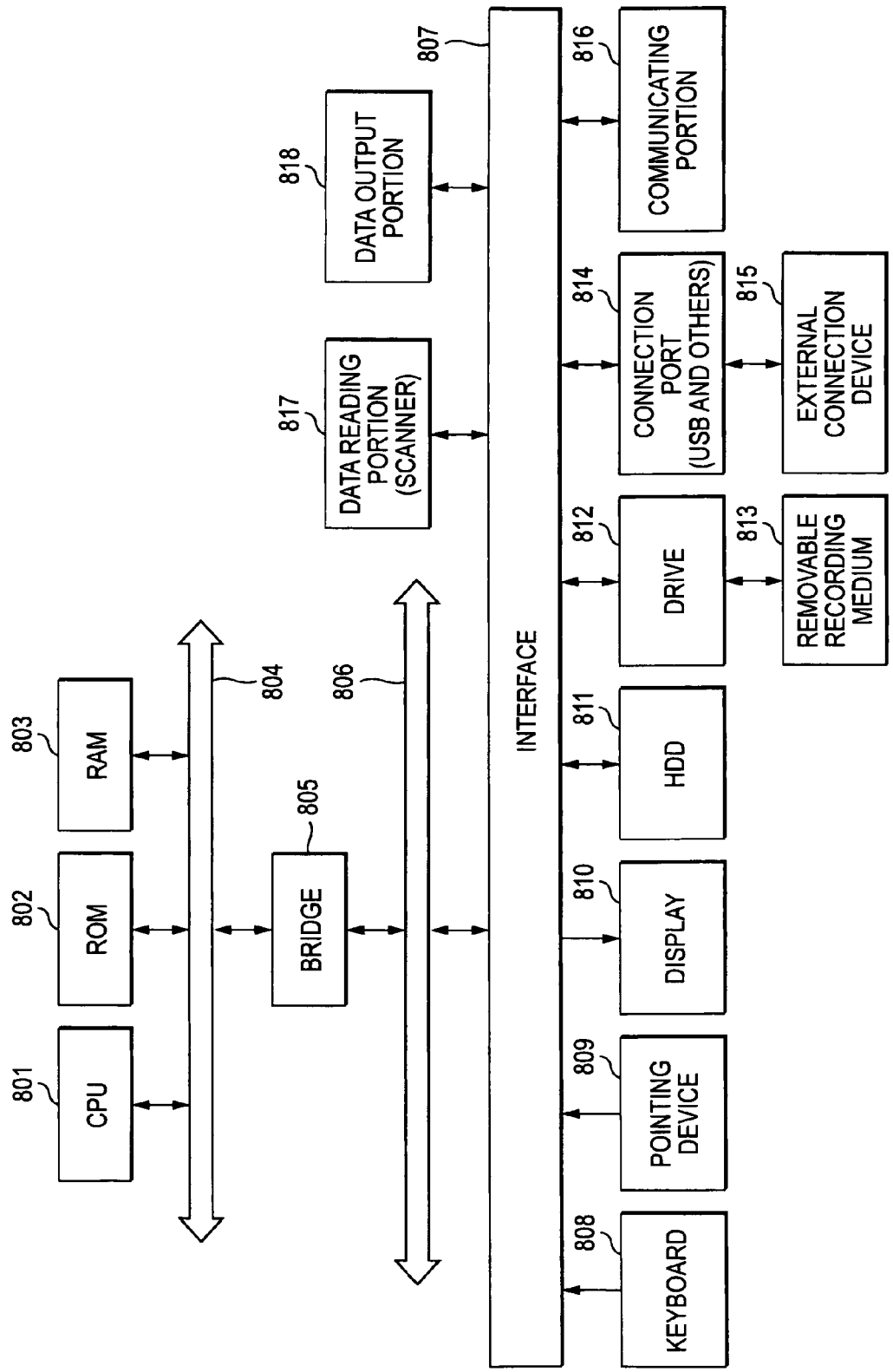
FIG. 8 is a block diagram showing an example of the hardware constitution of a computer for realizing the present embodiment.

Referring to FIG. 8, an example of the hardware constitution of the present embodiment will be explained below. For example, the constitution shown in FIG. 8 is applied to a personal computer (PC). This example of the hardware constitution includes: a data reading portion 817 such as a scanner; and a data output portion 818 such as a printer.

CPU (Central Processing Unit) 801 is a control unit to execute processing according to a computer program in which an execution sequence of each module, which is explained in the embodiment before, is described. In this case, the modules are: a layout analysis module 101; a character recognition module 102; a translation module 103; a character row direction judgment module 104; a rotation/inversion selection module 105; and a rotation/inversion processing module 106.

ROM (Read Only Memory) 802 accommodates a program and a calculation parameter used by CPU 801. RAM (Random Access Memory) 803 accommodates a program used for the execution of CPU 801 and a parameter appropriately changed in the execution. These components are connected to each other by the host bus 804 including CPU bus.

The host bus 804 is connected to the external bus 806 such as PCI (Peripheral Component Interconnect/Interface) bus through the bridge 805.

The pointing device 809 such as a keyboard 808 or a mouse is an input device operated by an operator. The display 810 is a liquid crystal display unit or CRT (Cathode Ray Tube). Various information is displayed on this display 810 as a text or image information.

HDD (Hard Disk Drive) 811 includes and drives a hard disk, so that a program and information to be executed by CPU 801 are recorded or reproduced. The hard disk accommodates a received image, a result of recognition of characters and a result of translation. The hard disk further accommodates various data processing programs and various computer programs.

The drive 812 reads out data or a program recorded in the removable recording medium 813 such as a magnetic disk, an optical disk, an optical magnetic disk or a semiconductor memory. The thus read data or program is supplied to RAM 803 connected through the interface 807, the external bus 806, the bridge 805 and the host bus 804. The removable recording medium 813 can be utilized as a data recording region in the same manner as that of the hard disk.

The connection port 814 is a port to which the external connection device 815 is connected. The connection port 814 has connecting portions such as USB and IEEE 1394. The connection port 814 is connected to CPU 801 through the interface 807, the external bus 806, the bridge 805 and the host bus 804. The communication portion 816 is connected to the network and executes the communication processing with the outside. The data reading portion 817 is, for example, a scanner and executes the document reading processing. The data output portion 818 is, for example, a printer and executes the document data output processing.

In this connection, FIG. 8 shows one example of the hardware constitution. The present embodiment is not limited to the constitution shown in FIG. 8. As long as the module explained in the present embodiment can be executed, any constitution may be adopted. For example, some module may be composed of an exclusive hardware (for example, Application Specific Integrated Circuit: ASIC). Some module may arranged in an external system and connected by a communication line. Further, a plurality of systems shown in FIG. 8 may be connected to each other by a communication circuit and operated in cooperation with each other. The hardware constitution may be incorporated into a copier, a facsimile, a scanner, a printer or a compound machine (an image processing apparatus having two or more functions of the scanner, the printer, the copier and the facsimile).

In the above embodiment, after the image arrangement processing module 110 has executed processing, the translated sentence arrangement processing module 111 executes processing. However, the order of the image arrangement processing module 110 and the translated sentence arrangement processing module 111 may be reversed. Alternatively, the image arrangement processing module 110 and the translated sentence arrangement processing module 111 may simultaneously execute processing.

In this connection, in the embodiment described above, explanations are mainly made into the case in which English is translated into Japanese. However, the present invention is not limited to the above specific case. It is possible to apply the present invention to a case in which Japanese is translated into another language such as French, Chinese or Arabic.

In this connection, the explained program may be provided being accommodated in a recording medium. Alternatively, the program may be provided by a communication means. In this case, concerning the program, it can be considered that the invention is "A recording medium, in which a program is recorded, capable of being read by a computer".

"A recording medium, in which a program is recorded, capable of being read by a computer" is a recording medium, which is used for installing and executing a program and used for circulating the program, capable of being read by a computer.

In this connection, examples of the recording medium are: "DVD-R, DVD-RW, DVD-RAM" which are digital versatile disks (DVD), the standard of which is made by the DVD forum; "DVD+R, DVD+RW" which are DVD+RW, the standard of which is made; (CD-ROM), CD recordable (CD-R), CD rewritable (CD-RW) which are compact disks and read-only memories; an optical magnetic disk (MO); a flexible disk (FD); a magnetic tape; a hard disk; a random access memory (ROM); a random access memory (EEPROM) capable of being electrically erased and rewritten; a flash memory; and a random access memory (RAM).

The entire program described above or a portion of the program may be recorded in the above recording medium and stored and circulated. By the correspondence, the above program may be transmitted through the cable network such as a local area network (LAN), metropolitan area network (MAN), wide area network (WAN), Internet, Intranet, and Extranet. Alternatively, the above program may be transmitted through the wireless network. Further, the above program may be transmitted through a transmission medium in which the above networks are combined with each other. Alternatively, the above program may be carried by the carrier waves.

Further, the above program may be a portion of the other program. Alternatively, the above program may be recorded in the recording medium together with another program. The above program may be recorded in a plurality of recording mediums being divided. The above program may be recorded in any form such as compression or encoding as long as the compressed or encoded program can be restored.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents

What is claimed is:

1. An image processing apparatus comprising:
   a region extracting unit extracts a rectangular character region on an image;
   a character recognizing unit that recognizes characters in the character region extracted by the region extracting unit;
   a translating unit that translates a recognition result obtained by the character recognizing unit;
   a changing unit that changes a constitution of the image with respect to the character region extracted by the region extracting unit according to a direction of the characters in the character region extracted by the region extracting unit, and according to a direction of the characters of the language translated by the translating unit, and
   an aspect-ratio changing unit that changes an aspect ratio of the character region, wherein
   if the direction of the characters in the character region extracted by the region extracting unit is different from the direction of the characters of the language translated by the translating unit, the changing unit performs rotation processing or inversion processing on the character region, and
   if the rotation processing is performed on the character region, the aspect-ratio changing unit changes the aspect ratio of the character region, and if the inversion processing is performed on the character region, the aspect ratio changing unit does not change the aspect ratio of the character region.

2. The image processing apparatus as claimed in claim 1, wherein
   the region extracting unit extracts an image region, and
   the changing unit conducts the rotation processing or the inversion processing according to whether or not the image region is extracted by the region extracting unit.

3. The image processing apparatus as claimed in claim 1, wherein
   the region extracting unit extracts a table region, and
   the changing unit changes a constitution of the table region extracted by the region extracting unit.

4. The image processing apparatus as claimed in claim 1, further comprising:
   an arranging unit that arranges a translation result obtained by the translating unit to an image constitution changed by the changing unit; and
   an image outputting unit that outputs an image arranged by the arranging unit.

5. A non-transitory computer readable medium storing a program causing a computer to execute a process for performing an image processing, the process comprising:
   extracting a rectangular character region on an image;
   recognizing characters in the extracted character region;
   translating a recognition result in the recognizing of the characters; and
   changing a constitution of the image with respect to the extracted character region according to a direction of the characters in the extracted character region, and according to a direction of the characters of the translated language, wherein
   if the direction of the characters in the extracted character region is different from the direction of the characters of the translated language, performing rotation processing or inversion processing on the character region, and
   if the rotation processing is performed on the character region, changing an aspect ratio of the character region, and if the inversion processing is performed on the character region, not changing the aspect ratio of the character region.

6. The image processing apparatus as claimed in claim 1, wherein
   if the image includes a image region, the region extracting unit further extracts the image region, and
   if the user selects the image region as being more important than the character region, the changing unit performs the inversion processing, and if not, the changing unit performs the rotation processing.

7. The image processing apparatus as claimed in claim 1, wherein
   if the image includes a image region, the region extracting unit further extracts the image region, and
   if the region extracting unit extracts the image region, the changing unit performs the inversion processing, and if the region extracting unit does not extract the image region, the changing unit performs the rotation processing.

* * * * *